(12) United States Patent
Lai (10) Patent No.: US 7,730,186 B2
(45) Date of Patent: Jun. 1, 2010

(54) NETWORKED QUEUING SYSTEM AND METHOD FOR DISTRIBUTED COLLBORATIVE CLUSTERS OF SERVICES

(75) Inventor: Cheng-Jia Lai, Mountain View, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 807 days.

(21) Appl. No.: 11/504,314

(22) Filed: Aug. 14, 2006

(65) Prior Publication Data

US 2007/0276934 A1    Nov. 29, 2007

Related U.S. Application Data

(60) Provisional application No. 60/809,137, filed on May 25, 2006.

(51) Int. Cl.
    *G06F 15/173*      (2006.01)
(52) U.S. Cl. .................. 709/226; 709/212; 709/224; 709/214
(58) Field of Classification Search .................. 709/226, 709/212, 214, 224
See application file for complete search history.

(56) References Cited

U.S. PATENT DOCUMENTS

| 6,128,642 | A * | 10/2000 | Doraswamy et al. | ......... 709/201 |
| 6,173,322 | B1 * | 1/2001 | Hu | ............... 709/224 |
| 7,062,556 | B1 * | 6/2006 | Chen et al. | .................. 709/226 |
| 2003/0110232 | A1 * | 6/2003 | Chen et al. | .................. 709/212 |

OTHER PUBLICATIONS

Ian Foster, et al., "Computational Grids", Chapter 2 of *The Grid: Blueprint for a New Computing Infrastructure*, Morgan-Kaufman, 1999.
Ian Foster, et al., "Globus: A Metacomputing Infrastructure Toolkit", *Int'l Journal of Supercomputer Applications*, 11(2):115-128, 1997.
Karl Czajkowski, et al., "A Resource Management Architecture for Metacomputing Systems" *Proceedings of the IPPS/SPDP '98 Workshop on Job Scheduling Strategies for Parallel Processing* pp. 62-82, 1998.
Shoji Ogura, et al., "Evaluation of the inter-cluster data transfer on Grid environment", *Proceedings of the 3rd IEEE/ACM Int'l Symposium on Cluster Computing and the Grid*, IEEE Computer Science, 2003.

(Continued)

*Primary Examiner*—Wing F Chan
*Assistant Examiner*—Ruolei Zong
(74) *Attorney, Agent, or Firm*—Sughrue Mion, PLLC (57) ABSTRACT

A high-performance queueing method to implement a shared queue for collaborative clusters of servers, where each cluster of servers maintains a local queue, and those queues are networked to form a unified (or shared) queue for all those servers in clusters. Requests in an overcrowded queue are forwarded to some other queues, with a randomized algorithm and a message-exchange algorithm between the networked queues. Requests may be forwarded between clusters multiple times. A request is to be accepted with a higher probability by a cluster if the cluster is visited earlier in the order and if the cluster itself has a higher probability to accept the received request. This technique ensures that the requests are forwarded to a queue that has a shorter length (thus a shorter waiting time for first-in-first-out queues) and is closer to the original cluster with a higher probability.

23 Claims, 4 Drawing Sheets

OTHER PUBLICATIONS

Sang-Min Park, et al., "Chameleon: A Resource Scheduler in A Data Grid Environment" *Proceedings of the 3rd IEEE/ACM Int'l Symposium on Cluster Computing and the Grid,* IEEE Computer Science, 2003.

L. Kleinrock, M/M/m: The m-Server Case, Chapter 3 of *Birth-Death Queueing Systems in Equilibrium,* pp. 102-111, vol. 1, Wiley, New York, 1975.

Peterson Davie, "Queuing Disciplines", Chapter 6 of *Computer Networks: A System Approach,* pp. 457-464, Morgan Kaufmann, San Francisco, 2000.

Bertsekas, et al., "Queuing Models-Little's Theorem", "M/M/1 queuing system", and "M/M/m, M/M/∞, M/M/m/m, and other Markov systems", Chapter 3 of *Data Networks,* pp. 152-179, 2nd Ed. Prentice Hall, New Jersey, 1992.

S. Keshave, "Scheduling", Chapter 9 of *An engineering Approach to Computer Network,* pp. 209-263, Addison-Wesley, 1997.

Ravindran, et al., "Queueing Models", Chapter 7 of *Operations Research: Principles and Practice,* pp. 305-341, 2nd Ed., John Wiley & Sons, Inc., 1987.

Theorore Johnson, "Designing a Distributed Queue", *Proceedings of the 7th IEEE Symposium on Parallel and Distributed Processing,* pp. 304-311, San Antonio, Texas, Oct. 1995.

G. Coulouris, et al., "Distributed Operating Systems—Communication and invocation", Section 6.5 in *Distributed Systems: Concepts and Design,* pp. 182-190, 2nd Ed. Addison-Wesley, 1994.

A. Geist, et al., PVM: Parallel Virtual Machine, MIT Press, 1994.

Samir Djilali, "P2P-RPC: Programming Scientific Applications on Peer-to-Peer Systems with Remote Procedure Call", *Proceedings of the 3rd IEEE/ACM Int'l Symposium on cluster Computing and the Grid (CCGRID '03),* IEEE Computer Society, 2003.

Remzi H. Arpaci-Dusseau, "The Distributed Queue", Chapter 5 of *Performance Availability for Networks of Workstations.* PhD dissertation, University of California, Berkeley, 1999.

Sanjay Ghemawat, et al., "The Google File System", *Proceedings of the 19th ACM Symposium on Operating System Principles,* Oct. 2003, Bolton Landing, New York, USA.

Douglas Thain, et al., "Distributed Computing in Practice: The Condor Experience", *Concurrency: Practice Experience,* 2004; 0:0-20, John Wiley & Sons, Ltd., 2004.

D.H.J. Epema, et al., "A Worldwide Flock of Condors: Load Sharing among Workstation Clusters", *Journal on Future Generations of Computing Systems,* vol. 12, 1996.

B.Clifford Neuman, et al., "The Prospero Resource Manager: A Scalable Framework for Processor Allocation in Distributed Systems", *Concurrency: Practice and Experience,* 6(4); pp. 339-355, Jun. 1994.

Jon B. Weissman, "Gallop: The Benefits of Wide-Area Computing for Parallel Processing", *Journal of Parallel and Distributed Computing,* 54(2), Nov. 1998.

Andrew S. Grimshaw, et al., "Legion: The next logical step toward the world-wide virtual computer", *Communications of the ACM,* Jan. 1997, Association for Computing Machinery, Inc.

Larry Rudolph, et al., "A Simple Load Balancing Scheme for Task Allocation in Parallel Machines", *Processing of the 3rd ACM symposium on Parallel algorithms and architectures,* pp. 237-245, 1991, Association for Computing Machinery, Inc.

Valeria Cardellini, et al., "Dynamic Load Balancing on Web-Server Systems", *IEEE Internet Computing,* pp. 28-39, May-Jun. 1999.

Kai Shen, et al., "Cluster Load Balancing for Fine-grain Network Services", *Proceedings of the Int'l Parallel and Distributed Processing Symposium,* 2002, IEEE Computer Society.

* cited by examiner

NETWORKED QUEUING SYSTEM AND METHOD FOR DISTRIBUTED COLLBORATIVE CLUSTERS OF SERVICES

CROSS-REFERENCE TO RELATED APPLICATION

This application claims the benefit of priority to U.S. Provisional Patent Application No. 60/809,137 filed on May 25, 2006, which is incorporated by reference in its entirety for all purposes as if fully set forth herein.

DESCRIPTION OF THE INVENTION

1. Field of the Invention

The present invention is related to computer networking and, more specifically to queuing in a computer cluster environment.

2. Description of the Related Art

Load balancing has been an increasingly important issue for handling computational intensive tasks in a distributed system using Grid and cluster computing. There are several reasons for the increasing use of such distributed systems since the 1990s. First, scientists can deploy a parallel algorithm for handling a complex computing task on multiple workstations and personal computers as fast as running it on a supercomputer which had previously been thought to have unsurpassed computing power, while it costs much less to share the workstations and personal computers than to buy a supercomputer. Second, the fast growth of the Internet, wireless networks, and mobile computing has resulted in many applications that require a distributed computing environment due to the dispersed locations of the data and users. Last but not least, as the number of users may exponentially increase in a wide area network such as the Internet, the server can get heavily loaded in a short period of time which makes the server a 'hot-spot' such that the average service time for users is irrationally increased by the largely prolonged waiting times of user requests in the queue.

Thus, in Grid and cluster computing environments, multiple instances of a server are installed for handling a class of requests from the users, which is sometimes called a server pool or a cluster. Any server in the cluster can handle a request which is a computing task that needs to stay in a queue before one available server is assigned to process it. If no server in this cluster is available, forwarding it to another cluster is possible but networking those clusters can be difficult in terms of efficiency, scalability, and security. As in 2004, there had been 956 Condor pools (clusters of host computers of servers) involving 37,790 hosts globally. Service providers like Google reportedly have about 100,000 computers in their clusters. As reported in Dec. 8, 2005, Grid has contained 3.5 million computing devices as well as 1.3 million members in the world.

In general, as has been extensively studied in Queueing Theory, a shared queue for multiple servers will outperform separate queues each for one server because a shared queue allows any idle server to be assigned a task whenever the queue is nonempty, i.e. a request is waiting. However, it is practically very difficult to implement such a shared queue when those servers are installed in geographically dispersed locations on the network, i.e. in separate clusters, especially for a global business of which the intranet covers multiple sites on the earth. For example, Condor pools use flocking and gliding in to find an available server outside a cluster but with limited scalability and performance in a global network.

Therefore, the conventional queuing techniques fail to provide scalable queueing algorithm for creating a shared queues for collaborative clusters of servers.

SUMMARY OF THE INVENTION

The inventive methodology is directed to methods and systems that substantially obviate one or more of the above and other problems associated with conventional queueing techniques.

In accordance with one aspect of the inventive concept, there is provided a computerized system including a first cluster and a second cluster. The first cluster includes at least one server and a first queue and is operable to provide a service in response to a service request. The second cluster is operable to provide the service in response to the service request and includes a second queue. The first cluster is further operable to receive a service request and determine whether there is an idle server in the first cluster. If the idle server is present in the first cluster, the received request is assigned to the idle server. If the idle server is not present in the first cluster, the received request is either placed into the first queue or forwarded to the second cluster in accordance with a stochastic algorithm based on at least a first probability value.

In accordance with another aspect of the inventive concept, there is provided a method involving receiving a service request at a first cluster comprising a first queue and determining whether there is an idle server in the first cluster. If the idle server is present in the first cluster, the received request is assigned to the idle server. If the idle server is not present in the first cluster, the received request is either placed into the first queue or forwarded the received request to a second cluster in accordance with a stochastic algorithm based on at least a first probability value.

In accordance with yet another aspect of the inventive concept, there is provided a computer programming product embodied on a computer-readable medium. The inventive computer programming product includes code for receiving a service request at a first cluster comprising a first queue and a code for determining whether there is an idle server in the first cluster. If the idle server is present in the first cluster, the received request is assigned to the idle server; and if the idle server is not present in the first cluster, the received request is either placed into the first queue or forwarded to a second cluster in accordance with a stochastic algorithm based on at least a first probability value.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

An aspect of the inventive methodology is a high-performance queueing method and system designed to implement a shared queue for collaborative clusters of servers or grids. In one embodiment of the inventive methodology, each cluster of servers maintains a local queue, and those queues are networked to form a unified (or shared) queue for all servers in those clusters. The incoming service requests, which are received by an overcrowded queue are forwarded to other queues based on a randomized algorithm with carefully designed probabilities determined in accordance with queue lengths and/or other state. An embodiment of the inventive system is provided with a periodic message-exchange algorithm between the networked queues operable to represent priorities of support between clusters.

As would be appreciated by those of skill in the art, the inventive methodology allows the local queues to be networked to implement mutual agreements of support, which makes the grid of services adaptive to business partnerships and scalable with the number of participants. As it would be also appreciated, the inventive queueing method can forward requests between queues with locality-awareness and load-balance, and allow each cluster to maintain a local queue for fast processing locally originating requests, with low overhead like a server farm.

Thus, in accordance with an embodiment of inventive concept, on, we propose a high-performance queueing method to implement a shared queue for collaborative clusters of servers. Each cluster of servers maintains a local queue, while those queues are networked to form a unified (or shared) queue for all those servers in clusters. We propose a method for forwarding requests in an overcrowded queue to some other queues, with a randomized algorithm and a message-exchange algorithm between the networked queues.

Figure 1:
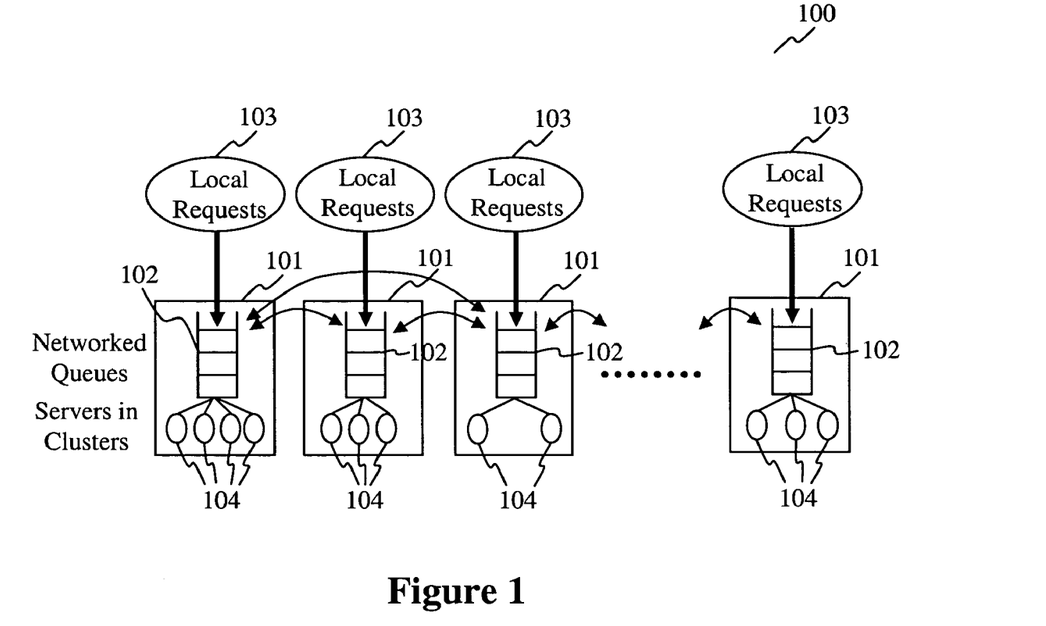
FIG. 1 illustrates an exemplary embodiment of a cluster system with networked queues, upon which the inventive concept may be implemented.

The inventive queuing system and method will now be described in detail with reference to the attached drawings. Referring to FIG. 1, the inventive system 100 includes multiple instances of a service that are installed in clusters 101, wherein each cluster 101 includes a queue 102 to hold the incoming service requests 103 that are received by the cluster. As it would be appreciated by those of skill in the art, the inventive concept is not limited to any specific type of service provided by the clusters 101. Such services may include services in accordance with any known or later developed service protocols, including, without limitation, HTTP, FTP, SOAP, SMTP, IMAP, POP and the like.

Each of the clusters 101 includes one or more servers 104, operable to provide the aforesaid services. The servers 104 may be arranged into clusters 101 using any known or later developed technique providing for high service availability and/or fault tolerance. Each of the clusters is operable to receive service requests from clients (not shown). The service requests directed to the clusters are called local service requests. In accordance with the inventive concept, the local service request received by one of the clusters 101 is either assigned to an idle server in the receiving cluster 1010, placed in a queue of the receiving cluster or forwarded by the receiving cluster to another cluster 101.

If, upon the receipt of a local service request by one of the clusters 101, there is still at least one server 104 available (or idle) within the receiving cluster 101, one of the available idle servers is immediately assigned to handle the incoming request. Otherwise, if all servers 104 in the receiving cluster are busy handling other requests, the request 103 is queued in the local queue of the receiving cluster 101 until one of the servers 104 within that cluster becomes idle. Alternatively, the received request may be forwarded to another cluster 101, wherein it can be either assigned to an idle server, queued into the queue 102 or further forwarded to yet another cluster.

It should be noted that the inventive system uses a stochastic algorithm for entering a new request 103 into the queue 102. Specifically, in the absence of an idle server in the receiving cluster, the request is appended to the end of the local queue 102 of the receiving cluster with a probability determined in accordance with the length of the local queue 102. Otherwise, the incoming request 103 is forwarded to a networked queue 102 belonging to another cluster 101 with a probability determined by the queue length and/or other state of all networked queues.

In the discussion below, is assumed that identical clusters 101 within the computer system are numbered starting with number 1, 2 and so on. In accordance with one embodiment of the inventive concept, the probability Pk with which a local queue in cluster k accepts a request is a function of Nk and mk, wherein Nk is the number of other waiting service requests in the queue of cluster k, and mk is the number of servers 104 in cluster k. In one exemplary embodiment, the value of Pk is calculated as follows:

$$P_k = \frac{1}{\frac{N_k}{m_k} + 1}.$$

In accordance with another aspect of the inventive concept, the networked queues 102 of clusters 101 maintain links between each pair of neighboring queues. Such a link is created when two clusters 101 are configured to "support"

one another as first priority when any of the clusters suddenly received a very high number of requests in its queue. It should be noted that even those queues 102 that are not directly linked can still share their servers 104 because it is possible for a request 103 to be forwarded between clusters 101 more than once, i.e. over multiple hops to a remote queue.

Figure 2:
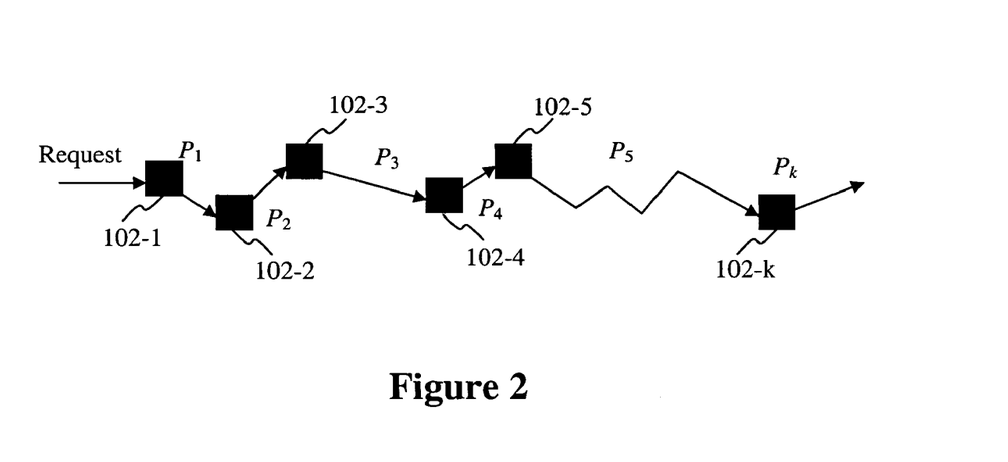
FIG. 2 illustrates stochastic acceptance in forwarding a request between queues in accordance with the inventive concept.

FIG. 2, illustrates an exemplary configuration wherein a single request is forwarded among clusters 101 more than once. This figure shows an exemplary forwarding path of a request, which is forwarded between queues 102-1 through 102-K of clusters 101 multiple times. In this embodiment, the k-th queue 102-K visited by the request independently determines if it accepts and stores the request or instead forwards it along to the next queue using Pk. Specifically, queue 102-1 accepts the request with probability P1, queue 102-2 accepts the request with probability P2 and so on.

Figure 3:
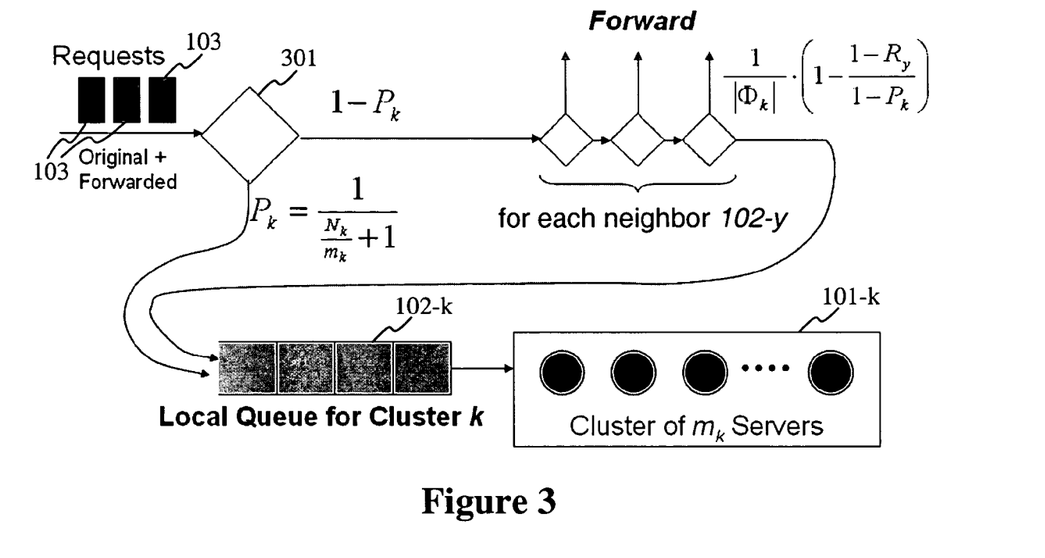
FIG. 3 illustrates the decision process of accepting or forwarding an incoming request in accordance with the inventive concept.

FIG. 3 illustrates the decision process 301 for determining whether cluster 101-K will accept a request 103 into its queue 102-K. This decision process includes the following three steps. First, with probability Pk, the receiving queue 102-K will simply accept the request. Otherwise, the process continues to the second step, wherein the receiving queue 102-K attempts to forward the request to only one of its neighbor queues directly linked to the receiving queue 102-K in a randomized manner described hereinbelow. It should be also noted that in one embodiment of the inventive system, each queue 102 periodically exchanges its "local state" with all of its neighbors, while the local state is a pair of numbers (Pk, Rk) for this queue; wherein Pk is as previously defined, and Rk is defined as $$R_k = 1 - (1 - P_k) \cdot \prod_{\forall y \in \Phi_k} (1 - P_y),$$

wherein $\Phi_k$ is the set of all neighbors of the queue 102-K in the k-th cluster. When this queue attempts to forward a request, the request is forwarded to a neighbor queue 102-Y with probability:

$$\frac{1}{|\Phi_k|} \cdot \left(1 - \frac{1 - R_y}{1 - P_k}\right),$$

wherein $R_y$ is the value in the latest state of the queue 102-Y, that this queue has known, and $|\Phi_k|$ is the number of neighbors of queue 102-Y. The normalization by $(1-P_k)$ is due to the fact that the value $P_k$ has contributed to the earlier calculation of $R_y$ on queue 102-Y, which should be countered.

Finally, if all attempts of forwarding the request 103 in the aforesaid second step are rejected by randomness, the request will just stay in the k-th queue 102-K. In one embodiment of the inventive concept, after a predetermined period of time, the k-th queue 102-K could again try to forward the request 103 if the length of the queue 102-K remains long, with a continuously low Pk.

It should be noted that a request 103 may be rejected by a local queue due to reasons other than the current queue load, for example, due to a failure of remote user authentication or billing negotiation. These factors in effect make Pk smaller. As would be appreciated by those of ordinary skill in the art, these extra mechanisms are not essential to the present invention.

As will be explained hereinbelow, a request 103 is to be accepted with a higher probability by a cluster 101 if the cluster 101 is visited earlier in the order and if the cluster itself has a higher probability to accept the received request. In addition, in accordance with one aspect of the inventive concept, a request 103 is unlikely to be forwarded in an infinitely long path such as in a cycle.

An embodiment of the invention has been tested by simulation. The simulation results showed that a created shared queue had outperformed separate queues in dynamic environments where users come and go in Poisson processes. Visualization of the simulation results in animation shows that the on-the-fly queue lengths are reduced and the average waiting time of requests is reduced, too.

As it will be understood by a person of skill in the art, the inventive randomized forwarding algorithm ensures that a request is accepted by a queue that is closer to the original receiving cluster with a higher probability. This minimizes the number of required forward operations of the request. In the following description, Qk denotes the probability that the request is accepted by the k-th visited instance. For all values of k=1, 2, 3 . . . , the value of Qk is calculated in accordance with the following formula:

$$Q_k = \frac{\prod_{i=1}^{k}(1-P_i)}{1-P_k} \cdot P_k.$$

Although one might surmise that an ideal load-balancing algorithm should result in the same ratio Qk/Pk for all k's, one of ordinary skilled in the art would appreciate that the locations of the instances should also be considered as an important factor. That is, an instance "closer" to the requester should also have a "higher" probability to accept the given the same load—the inventive approach satisfies both the "load-balance" and "locality-awareness" requirements.

Figure 4:
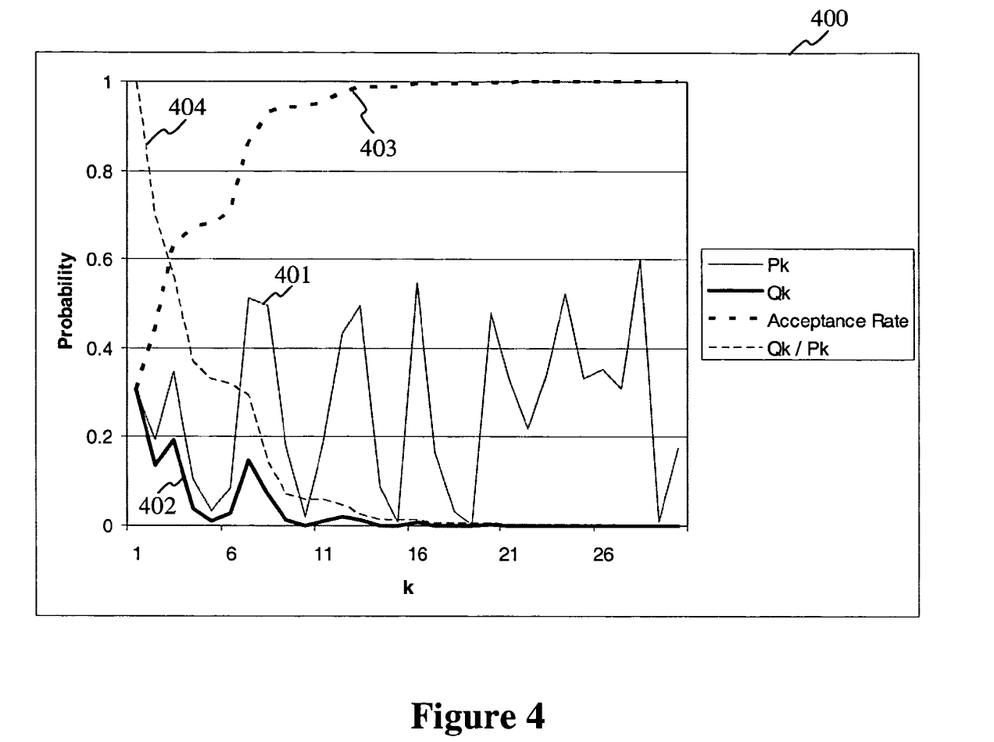
FIG. 4 illustrates the exemplary probability of accepting a request with random $P_k$ between 0 and 0.6.

In the exemplary embodiment shown in FIG. 3, the values of Pk are chosen randomly from a closed interval between 0 and 0.6 (averaged 0.3) for the k-th visited cluster 101-K. FIG. 4 showing exemplary plots of values of Pk, Qk, Acceptance Rate and Qk/Pk ratio as a function of k. With reference to FIG. 4, the resultant Qk curve is seen having similarity with the Pk curve, while the ratio of Qk to Pk actually decreases with k. Analytically, the acceptance rate within the first k visits is $$\sum_{j=1}^{k} Q_j = 1 - \prod_{i=1}^{k}(1-P_i).$$

As it will also appreciated by one of ordinary skill in art, request is to be accepted with a higher probability by a cluster if the cluster is visited earlier in the order and if the cluster itself has a higher probability to accept the received request. Therefore, the inventive technique ensures that the requests are forwarded to a queue that has a shorter length (thus a shorter waiting time if the queue is first-in-first-out) and is closer to the original cluster with a higher probability. Thus, it allows the local queues to be networked as mutual agreements of support, which makes the grid of services flexible and adaptive to business partnerships, and scalable with the number of participants in the service grid.

Figure 5:
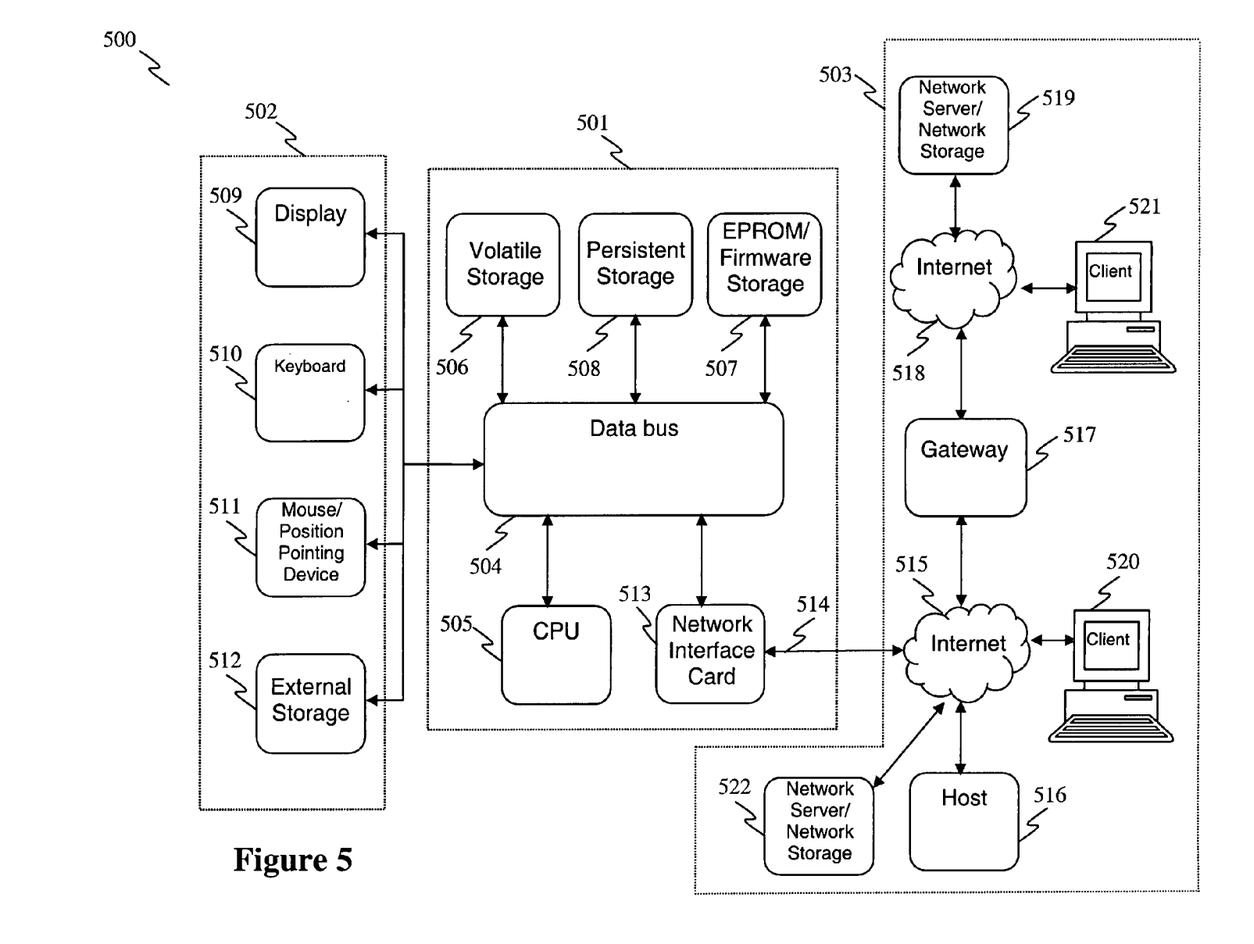
FIG. 5 illustrates an exemplary embodiment of a computer platform upon which the inventive system may be implemented.

FIG. 5 is a block diagram that illustrates an embodiment of a computer/server system 500 upon which an embodiment of the inventive clusters 101 may be implemented. Each of the clusters 101 may include one or more of platforms 500 interconnected as described hereinabove. The system 3200 includes a computer/server platform 501, peripheral devices 502 and network resources 503.

The computer platform 501 may include a data bus 504 or other communication mechanism for communicating information across and among various parts of the computer platform 501, and a processor 3205 coupled with bus 3201 for processing information and performing other computational and control tasks. Computer platform 3201 also includes a volatile storage 3206, such as a random access memory (RAM) or other dynamic storage device, coupled to bus 3204 for storing various information as well as instructions to be executed by processor 3205. The volatile storage 3206 also may be used for storing temporary variables or other intermediate information during execution of instructions by processor 3205. Computer platform 3201 may further include a read only memory (ROM or EPROM) 3207 or other static storage device coupled to bus 3204 for storing static information and instructions for processor 3205, such as basic input-output system (BIOS), as well as various system configuration parameters. A persistent storage device 3208, such as a magnetic disk, optical disk, or solid-state flash memory device is provided and coupled to bus 3201 for storing information and instructions.

Computer platform 3201 may be coupled via bus 3204 to a display 3209, such as a cathode ray tube (CRT), plasma display, or a liquid crystal display (LCD), for displaying information to a system administrator or user of the computer platform 3201. An input device 3210, including alphanumeric and other keys, is coupled to bus 3201 for communicating information and command selections to processor 3205. Another type of user input device is cursor control device 3211, such as a mouse, a trackball, or cursor direction keys for communicating direction information and command selections to processor 3204 and for controlling cursor movement on display 3209. This input device typically has two degrees of freedom in two axes, a first axis (e.g., x) and a second axis (e.g., y), that allows the device to specify positions in a plane.

An external storage device 3212 may be connected to the computer platform 3201 via bus 3204 to provide an extra or removable storage capacity for the computer platform 3201. In an embodiment of the computer system 3200, the external removable storage device 3212 may be used to facilitate exchange of data with other computer systems.

The invention is related to the use of computer system 3200 for implementing the techniques described herein. In an embodiment, the inventive system may reside on a machine such as computer platform 3201. According to one embodiment of the invention, the techniques described herein are performed by computer system 3200 in response to processor 3205 executing one or more sequences of one or more instructions contained in the volatile memory 3206. Such instructions may be read into volatile memory 3206 from another computer-readable medium, such as persistent storage device 3208. Execution of the sequences of instructions contained in the volatile memory 3206 causes processor 3205 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 3205 for execution. The computer-readable medium is just one example of a machine-readable medium, which may carry instructions for implementing any of the methods and/or techniques described herein. Such a medium may take many forms, including but not limited to, non-volatile media, and volatile media. Non-volatile media includes, for example, optical or magnetic disks, such as storage device 3208. Volatile media includes dynamic memory, such as volatile storage 3206.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, a carrier wave as described hereinafter, or any other medium from which a computer can read.

Various forms of computer readable media may be involved in carrying one or more sequences of one or more instructions to processor 3205 for execution. For example, the instructions may initially be carried on a magnetic disk from a remote computer. Alternatively, a remote computer can load the instructions into its dynamic memory and send the instructions over a telephone line using a modem. A modem local to computer system 3200 can receive the data on the telephone line and use an infra-red transmitter to convert the data to an infra-red signal. An infra-red detector can receive the data carried in the infra-red signal and appropriate circuitry can place the data on the data bus 3204. The bus 3204 carries the data to the volatile storage 3206, from which processor 3205 retrieves and executes the instructions. The instructions received by the volatile memory 3206 may optionally be stored on persistent storage device 3208 either before or after execution by processor 3205. The instructions may also be downloaded into the computer platform 3201 via Internet using a variety of network data communication protocols well known in the art.

The computer platform 3201 also includes a communication interface, such as network interface card 3213 coupled to the data bus 3204. Communication interface 3213 provides a two-way data communication coupling to a network link 3214 that is connected to a local network 3215. For example, communication interface 3213 may be an integrated services digital network (ISDN) card or a modem to provide a data communication connection to a corresponding type of telephone line. As another example, communication interface 3213 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 3213 sends and receives electrical, electromagnetic or optical signals that carry digital data streams representing various types of information.

Network link 3213 typically provides data communication through one or more networks to other network resources. For example, network link 3214 may provide a connection through local network 3215 to a host computer 3216, or a network storage/server 3217. Additionally or alternatively, the network link 3213 may connect through gateway/firewall 3217 to the wide-area or global network 3218, such as an Internet. Thus, the computer platform 3201 can access network resources located anywhere on the Internet 3218, such as a remote network storage/server 3219. On the other hand, the computer platform 3201 may also be accessed by clients located anywhere on the local area network 3215 and/or the Internet 3218. The network clients 3220 and 3221 may themselves be implemented based on the computer platform similar to the platform 3201.

Local network 3215 and the Internet 3218 both use electrical, electromagnetic or optical signals that carry digital data streams. The signals through the various networks and the signals on network link 3214 and through communication interface 3213, which carry the digital data to and from computer platform 3201, are exemplary forms of carrier waves transporting the information.

Computer platform 3201 can send messages and receive data, including program code, through the variety of network(s) including Internet 3218 and LAN 3215, network link 3214 and communication interface 3213. In the Internet example, when the system 3201 acts as a network server, it might transmit a requested code or data for an application program running on client(s) 3220 and/or 3221 through Internet 3218, gateway/firewall 3217, local area network 3215 and communication interface 3213. Similarly, it may receive code from other network resources.

The received code may be executed by processor 3205 as it is received, and/or stored in persistent or volatile storage devices 3208 and 3206, respectively, or other non-volatile storage for later execution. In this manner, computer system 3201 may obtain application code in the form of a carrier wave.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the computerized storage system with data replication functionality. It is intended that the specification and examples be considered as exemplary only, with a true scope and spirit of the invention being indicated by the following claims.

What is claimed is:

1. A computerized system comprising:
   a first cluster comprising at least two servers and a first queue and operable to provide a service in response to a service request; and
   a second cluster operable to provide the service in response to the service request and comprising a second queue, wherein the first cluster is operable to:
      receive a service request;
      determine whether there is an idle server in the first cluster;
      if the idle server is present in the first cluster, assign the received request to the idle server; and
      if the idle server is not present in the first cluster, either place the received request into the first queue or forward the received request to the second cluster, wherein a decision whether to place the request into the first queue or forward the received request to the second cluster is made in accordance with a stochastic algorithm based on at least a first probability value and wherein the stochastic algorithm comprises generation of at least one random number,
      wherein the stochastic algorithm is additionally based on a second probability determined based at least on a number of waiting service requests in the second queue.

2. The computerized system of claim 1, wherein the first probability value is determined based on a number of waiting service requests in the first queue.

3. The computerized system of claim 1, wherein the first probability value is determined based on a number of servers in the first cluster.

4. The computerized system of claim 1, wherein the first probability value is determined based on a number of waiting service requests in the first queue and a number of servers in the first cluster.

5. The computerized system of claim 1, further comprising a link between the first queue of the first cluster and the second queue of the second cluster.

6. The computerized system of claim 1, wherein the first cluster is operable to periodically furnish local state information to the second cluster.

7. The computerized system of claim 6, wherein the local state information comprises the first probability value.

8. The computerized system of claim 7, wherein the local state information further comprises a second probability value $$R_k = 1 - (1 - P_k) \cdot \prod_{\forall y \in \Phi_k} (1 - P_y),$$

wherein Pk is a first probability value and wherein $\Phi_k$ is a set of neighboring clusters of the first cluster, and
wherein Py is a first probability value of the each cluster in the set of neighboring clusters of the first cluster.

9. The computerized system of claim 1, wherein if the received request has been placed in the first queue and not forwarded to the second cluster, the first cluster is further operable to:
   wait a predetermined amount of time; and
   if the length of the first queue is greater than a predetermined threshold, retry forwarding the received request to the second cluster, wherein the decision whether to forward the received request to the second cluster is made based on at least a second probability value and wherein the second probability value decreases with number of forwarding retries.

10. A method comprising:
   receiving a service request at a first cluster comprising at least two servers and a first queue;
   determining whether there is an idle server in the first cluster;
   if the idle server is present in the first cluster, assigning the received request to the idle server; and
   if the idle server is not present in the first cluster, either placing the received request into the first queue or forwarding the received request to a second cluster, wherein a decision whether to place the request into the first queue or forward the received request to the second cluster is made in accordance with a stochastic algorithm based on at least a first probability value and wherein the stochastic algorithm comprises generation of at least one random number wherein the stochastic algorithm is additionally based on a second probability determined based at least on a number of waiting service requests in the second queue.

11. The method of claim 10, wherein the first probability value is determined based on a number of waiting service requests in each queue.

12. The method of claim 10, wherein the first probability value is determined based on a number of servers in each cluster.

13. The method of claim 10, wherein the first probability value is determined based on a number of waiting service requests in the each queue and a number of servers in the corresponding cluster.

14. The method of claim 10, further comprising periodically exchanging local state information with the second cluster.

15. The method of claim 14, wherein the local state information comprises the first probability value.

16. The method of claim 15,
wherein the local state information further comprises a second probability value $$R_k = 1 - (1 - P_k) \cdot \prod_{\forall y \in \Phi_k} (1 - P_y),$$

wherein Pk is a first probability value for a $k^{th}$ cluster and wherein $\Phi_k$ is a set of the neighboring clusters of the $k^{th}$ cluster, and
wherein Py is a first probability value of the each cluster in the set of neighboring clusters of the $k^{th}$ cluster.

17. A computer programming product embodied on a computer-readable storage medium comprising:
code for receiving a service request at a first cluster comprising at least two servers and a first queue; and
code for determining whether there is an idle server in the first cluster and if the idle server is present in the first cluster, assigning the received request to the idle server; and if the idle server is not present in the first cluster, either placing the received request into the first queue or forwarding the received request to a second cluster, wherein a decision whether to place the request into the first queue or forward the received request to the second cluster is made in accordance with a stochastic algorithm based on at least a first probability value and wherein the stochastic algorithm comprises generation of at least one random number,
wherein the stochastic algorithm is additionally based on a second probability determined based at least on a number of waiting service requests in the second queue.

18. The computer programming product of claim 17, wherein the first probability value of a cluster is determined based on a number of waiting service requests in the associated queue.

19. The computer programming product of claim 17, wherein the first probability value of a queue is determined based on a number of servers in the associated cluster.

20. The computer programming product of claim 17, wherein the first probability value for the first cluster is determined based on a number of waiting service requests in the first queue and a number of servers in the first cluster.

21. The computer programming product of claim 17, further comprising code for periodically exchanging local state information with neighboring clusters.

22. The computer programming product of claim 21, wherein the local state information comprises the first probability value.

23. The computer programming product of claim 22,
wherein the local state information further comprises a second probability value $$R_k = 1 - (1 - P_k) \cdot \prod_{\forall y \in \Phi_k} (1 - P_y),$$

wherein Pk is a first probability value for a $k^{th}$ cluster and wherein $\Phi_k$ is a set of neighboring clusters of the $k^{th}$ cluster, and
wherein Py is a first probability value of the each cluster in the set of neighboring clusters of the $k^{th}$ cluster.

* * * * *